Figure 1:
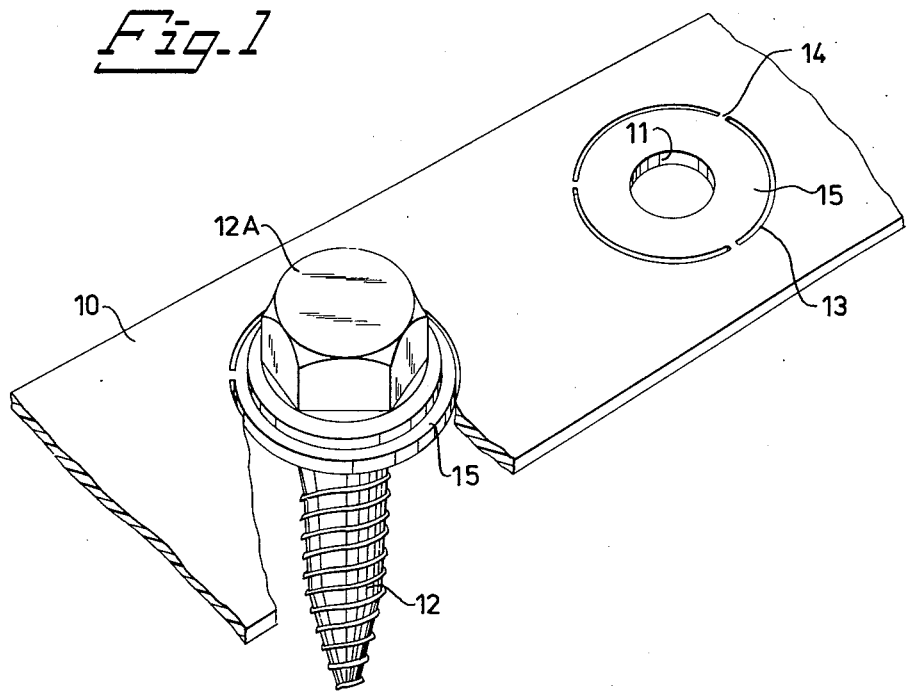

United States Patent [19]

Lejdegard et al.

[11] 4,019,631
[45] Apr. 26, 1977

[54] SCREW PACKAGE

[75] Inventors: Sixten Harald Lejdegard, Ramnäs; Stig Lennart Björklind, Hallstahammar, both of Sweden

[73] Assignee: Bulten-Kanthal Aktiebolag, Sweden

[22] Filed: Apr. 18, 1975

[21] Appl. No.: 569,398

[30] Foreign Application Priority Data

Apr. 18, 1974 Sweden .......................... 7405197

[52] U.S. Cl. ..................... 206/347; 206/486; 206/820
[51] Int. Cl.² .................. B65D 85/24; B65D 73/00
[58] Field of Search .......... 206/347, 346, 343, 341, 206/338, 486, 49, 348, 820, 390; 85/50 R

[56] References Cited
UNITED STATES PATENTS

| 319,122 | 6/1885 | Pulaski | 206/49 |
|---|---|---|---|
| 2,556,844 | 6/1951 | Istwan | 206/72 |
| 3,202,270 | 8/1965 | Schory et al. | 206/348 |
| 3,211,284 | 10/1965 | Anstett | 206/347 |
| 3,299,766 | 1/1967 | Gould et al. | 85/50 R |
| 3,392,228 | 7/1968 | Zerwes | 85/50 R |
| 3,904,032 | 9/1975 | Maier | 206/347 |

*Primary Examiner*—William T. Dixson, Jr.
*Attorney, Agent, or Firm*—Hill, Gross, Simpson, Van Santen, Steadman, Chiara & Simpson

[57] ABSTRACT

A screw package comprising a carrier strip through which the screws extend transversely with the essentially flat under surface of the screw heads resting against the upper surface of the strip. The strip has holes the diameter of which is closely related to the shank diameter of the screws. Around each hole there extend arcuate slots, between the ends of which comparatively weak webs have been left, or deep weakening lines, in such a manner that, as a screw is driven in, a washer consisting of the carrier strip material will be separated from the carrier strip to be clamped between the under surface of the screw head and the work piece wherein the screw is applied.

4 Claims, 2 Drawing Figures

SCREW PACKAGE

BACKGROUND OF THE INVENTION

1. Field of the Invention

This invention relates to a screw package comprising a carrier strip and a plurality of screws extending transversely therethrough with the under surface of the screw heads resting against the upper surface of the carrier strip.

2. Prior Art

The U.S. Pat. No. 3,211,284 to E. P. Anstett, describes a nailing strip comprising a carrier strip of plastic, for instance, which carrier has recesses to accomodate the nail heads. When the nails are driven in, a washer is punched out from the strip, viz. by means of a punch in the automatic nailing machine. A prerequisite for this punching is that the nail head is so thin that it may be recessed into the carrier strip and that the nail is driven in by a comparatively fast blow without rotary movement. Thus, this teaching may not be adopted for use in connection with screws which have a higher head, and which are driven in with a rotary movement and a comparatively slow axial movement of the screw.

SUMMARY OF THE INVENTION

According to the invention there is provided a screw package comprising a carrier strip through which the screws extend transversely with the essentially flat under surface of the screw heads resting against the upper surface of the strip. The strip has holes the diameter of which is closely related to the shank diameter of the screws. Around each hole there extend arcuate slots, between the ends of which comparatively weak webs have been left, or deep weakening lines, in such a manner that, as a screw is driven in, a washer consisting of the carrier strip material will be separated from the carrier strip to be clamped between the under surface of the screw head and the work-piece wherein the screw is applied. The arcuate slots plus weak webs, and the deep weakening lines are referred to herein generically as circular lines of weakness.

ON THE DRAWING

Two embodiments of a screw package according to the invention are shown as examples in the enclosed drawing and are described in more detail below.

Figure 2:
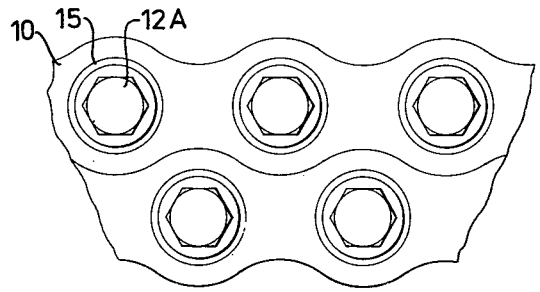

FIG. 1 is a fragmentary perspective view of a screw package according to the invention; and FIG. 2 is a plan view of a portion of a slightly modified screw package according to the invention.

AS SHOWN ON THE DRAWING

The screw package in FIG. 1 comprises a flat carrier strip 10 of "Nylon" or any similar suitable material. The carrier strip 10 is provided with holes 11 to accomodate evenly spaced screws 12 which extend transversely through the carrier strip 10 and have the normally entirely flat under surface of the head 12A resting against the upper surface of the carrier strip. In connection with the punching of the holes there have been punched out around each hole a plurality of arcuate slots 13 which are separated by weak webs 14, viz. In such a manner that the washer 15 left between the hole 11 and the slots 13 may be separated from the remainder of the strip 10 comparatively easily on application of the screw, in order to serve as a washer for the screw 12. The washer 15 may serve the practical use of being a sealing washer, protecting sensitive material against scratches and acting as a friction improving locking washer.

The width and thickness of the carrier strip should be adopted based on the circumstances in each case. As far as the thickness is concerned, very satisfying results have been reached with a carrier strip of "Nylon" having a thickness in the range of 0.5 - 1.0 mm, particularly a thickness of 0.7 mm. The mutual spacing between the screws 12 should be chosen according to the dimensions of the screws and also in accordance with the construction of the power screw driver. On the drawing, the "prepunched" washers 15 are shown as being slightly spaced from each other in the longitudinal direction of the carrier strip 10 but there is apparently nothing to prevent the washers from being tangent to each other.

In FIG. 1 the carrier 10 is shown as being a simple strip with straight sides but, of course, the carrier 10 may also take the shape of a sheet which may be provided with tearing lines or the like to easily permit severing off of strip-shaped carriers 10 therefrom, substantially of the same shape as shown in FIG. 1. Also, as shown in FIG. 2, the carrier strip 10 may be provided with waveshaped edges or the like to permit a better utilization of the carrier strip material than is the case with a strip according to FIG. 1, having straight edges.

The diameter of the circle along which the arcuate slots 13 are disposed may be substantially equal to the width of the carrier strip 10 so that, as the screws are applied, only very tiny edge portions are left along the longitudinal edges of the carrier strip 10, to readily permit the residual strip to be torn off so it does not interfere with the work. Also, it is preferable to make the carrier 10 slightly wider than the said diameter to obtain, at least at one edge of the carrier, a wider edge portion wherein holes, gearlike teeth or the like is formed, which may advantageously be used for advancing of the carrier through an automatic power screw driver.

Although not shown in the drawing it is contemplated that the screw package according to the invention could be completed by a covering foil, e.g. of so-called shrink plastic, over the heads of the screws, so as to effectively secure the screws to the carrier 10 during transportation. Such covering foil may be peeled off as the screw package is fed into the power screw driver, but if the covering foil is properly dimensioned, it may even be left on the screw package as this is fed into the power screw driver.

Although various minor modifications might be suggested by those versed in the art, it should be understood that we wish to embody within the scope of the patent warranted hereon all such embodiments as reasonably and properly come within the scope of our contribution to the art.

What we claim is:

1. A screw package comprising:
  a. a carrier strip of flat sheet material having a series of holes;
  b. means defining circular lines of weakness in said strip entirely surrounding each of said holes whereby a prospective flat washer is defined in said strip; and
  c. a plurality of screws having heads and shanks, said heads having entirely flat undersides disposed against the uppermost surface of said strip, and said shanks extending through said holes and having a snug screw-retaining fit with said strip in said holes.

2. A screw-package according to claim 1 in which said flat sheet material has the physical properties of nylon.

3. A screw-package according to claim 1 in which the edge portions of said carrier strip adjacent to said screws can extend into the space between successive screws on each adjacent one of said strips.

4. A screw-package according to claim 1 including a sheet of plastic foil carried by said carrier strip in surrounding relation to said heads.

* * * * *